E. S. McLEAN.
PERCOLATOR.
APPLICATION FILED DEC. 4, 1911.
1,029,939.
Patented June 18, 1912.
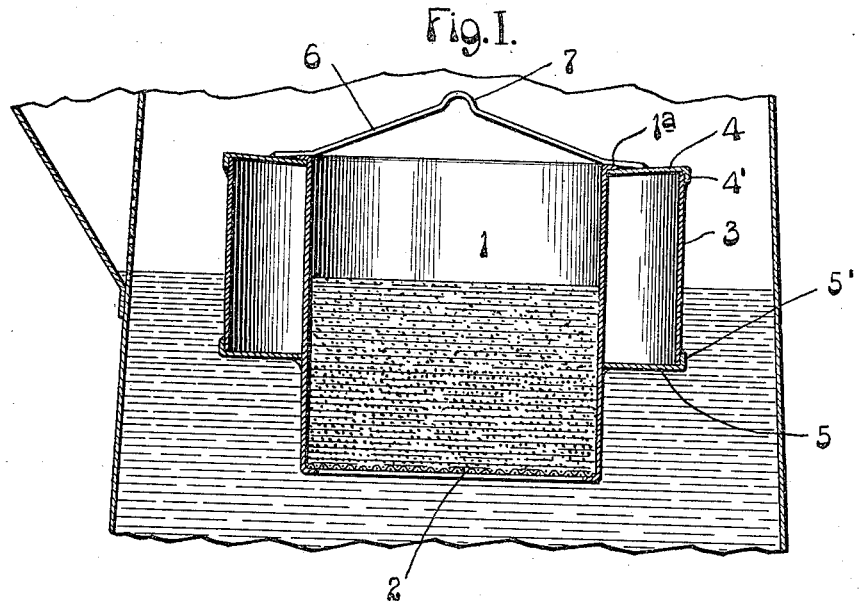
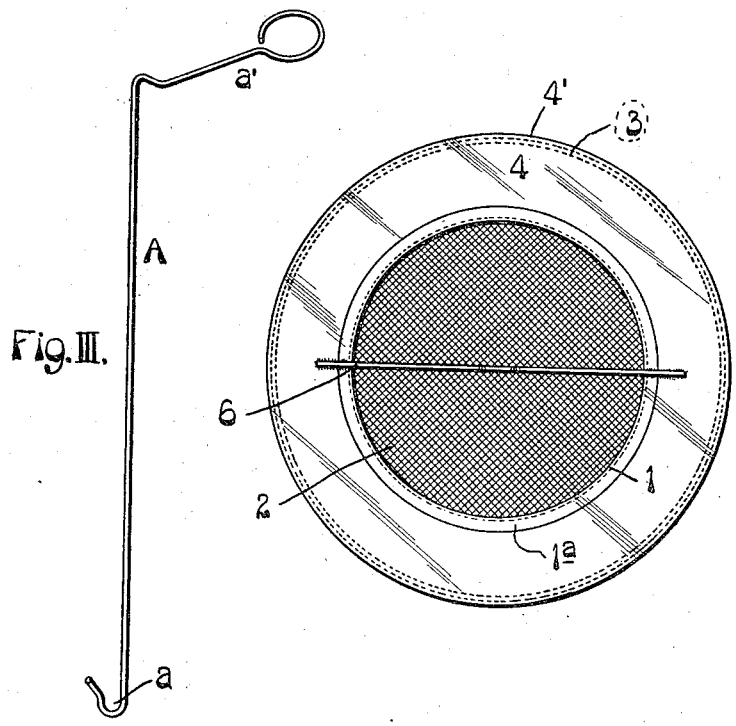
Attest
A. J. McCauley
E. B. Linus
Inventor:
E. S. McLean
by Knight & Cook
Attys.

UNITED STATES PATENT OFFICE.

EDWARD S. McLEAN, OF MARISSA, ILLINOIS.

PERCOLATOR.

1,029,939. Specification of Letters Patent. Patented June 18, 1912.

Application filed December 4, 1911. Serial No. 663,736.

*To all whom it may concern:*

Be it known that I, EDWARD S. McLEAN, a citizen of the United States of America, and a resident of Marissa, in the county of St. Clair and State of Illinois, have invented certain new and useful Improvements in Percolators, of which the following is a full, clear, and exact description, reference being had to the accompanying drawings, forming a part of this specification.

My invention relates to a percolator for use in making such beverages as coffee and tea, and it has for its object the production of a percolator that will float in the water contained by the vessel in which the percolator is placed, thereby dispensing with the necessity of furnishing supporting means for the percolator and permitting its employment in any vessel it may be decided to utilize it in.

Figure I is a vertical section through my percolator and a vessel containing it. Fig. II is a top or plan view of the percolator. Fig. III is a perspective view of an implement that may be utilized in placing the percolator in and removing it from a vessel in which the percolator is to be used.

In the drawings:—1 designates the container of my percolator, which is provided with a perforated bottom 2 and has an open top. The perforated bottom of this container serves as a support for coffee or other substance that is placed therein, through which water may freely circulate to gain access to such substance.

The container 1 of my percolator is surrounded by a float comprising a vertical wall 3, concentric with the vertical wall of the container, and top and bottom rings 4 and 5 secured to the container wall and the vertical float wall 3, thereby providing a closed head or chamber between the container wall and the float wall 3. The top ring 4 is preferably secured to the container wall by soldering it to a top flange 1ª of said wall, and secured to the float wall 3 by providing it with a downturned annular flange 4' that is soldered to said wall. The bottom ring 5 is preferably soldered at its inner edge to the wall of the container and is provided with an upturned annular flange 5' that is soldered to the float wall 3.

6 designates a bail that is secured by solder, or other suitable means, to the upper end of the percolator. This bail is preferably provided at its longitudinal center with a loop or crimp 7 that may be engaged by the lifting implement A illustrated in Fig. III, which is provided at its lower end with a hook $a$ for application to the loop 7, and at its upper end with a handle $a'$.

For the purpose of adding to the stability of my percolator while it is in use to prevent its being overturned due to violent disturbance of boiling water in which it floats, the container 1 is made of considerably greater depth than the float surrounding it, thus providing in the percolator what may be termed a central leg having an imperforate wall and which offers sufficient resistance beneath the float chamber to avoid undue toppling movement of the percolator as it is caused to rise and fall, due to the agitation of the water in which it floats.

The wall of the leg extension of the container being imperforate, boiling and agitated water cannot pass transversely through said imperforate wall, as it is permitted to do in similar percolators heretofore devised, and, the leg extension, by acting in a manner similar to that in which the center board of a boat acts, prevents toppling or upsetting of the percolator, and the dumping of the contents of the container.

By providing the bail with the described loop and utilizing the implement A when placing the percolator in the vessel in which it is to be used and removing it from said vessel, the percolator may be deposited and removed without any liability of its being upset.

I claim:—

1. A percolator comprising a central container, and a float surrounding said container; said container comprising a leg extension with an imperforate wall extended beneath the bottom of said float.

2. A percolator comprising a central container, and a float surrounding said container; said container comprising a leg extension with an imperforate wall extended beneath the bottom of said float, and a perforate bottom at the lower end of said leg extension.

EDWARD S. McLEAN.

In the presence of—
EDWIN D. McLEAN,
JAMES ALLEE.

Copies of this patent may be obtained for five cents each, by addressing the "Commissioner of Patents, Washington, D. C."